United States Patent Office 2,732,358
Patented Jan. 24, 1956

2,732,358

COPOLYMERS OF ACRYLONITRILE AND N-BENZYLACRYLAMIDE

Wilford Donald Jones, Summit, N. J., assignor to Celanese Corporation of America, New York, N. Y., a corporation of Delaware No Drawing. Application September 26, 1952, Serial No. 311,779

8 Claims. (Cl. 260—30.8)

This invention relates to polymers and relates more particularly to polymers of N-benzylacrylamide.

An importan object of this invention is the preparation of polymers of N-benzylacrylamide.

A further object of this invention is the preparation of copolymers of N-benzylacrylamide and acrylonitrile.

Other objects of this invention will be apparent from the following detailed description and claims.

According to the present invention, polymers may be produced by polymerizing N-benzylacrylamide either alone or together with other ethylenically unsaturated compounds. Suitable unsaturated compounds with which the N-benzylacrylamide may be copolymerized are, for example, vinyl acetate, acrylonitrile, methacrylonitrile, methyl acrylate, and methyl methacrylate. The N-benzylacrylamide may be present in quantities as low as 2 mole percent and as high as 98 mole percent depending upon the properties desired in the final product.

A particularly valuable class of polymers are those obtained by copolymerizing N-benzylacrylamide with acrylonitrile. As is well known, polyacrylonitrile possesses a number of desirable properties, particularly a high melting point, which render it eminently suited for the production of filaments, films and the like. However, the utility of polyacrylonitrile is limited by the fact that it is insoluble in all common, inexpensive organic solvents and the products prepared therefrom exhibit extremely poor dyeing properties. Numerous proposals have been made to copolymerize acrylonitrile with other unsaturated compounds in order to obtain a product of improved solubility and dyeing properties. While a number of the copolymers previously produced in an effort to attain this end do show considerable improvement in these respects, these improvements are accompanied by a lowering in the melting point of the products to a considerable and undesirable extent. The copolymers of N-benzylacrylamide and acrylonitrile of the present invention not only show much improved solubility and dyeing properties as compared with acrylonitrile polymers, but also have a relatively high melting point so that filaments, films and the like prepared from said copolymers are useful for a wide range of applications. Such copolymers containing at least about 50 mole percent of acrylonitrile and particularly those containing between about 75 and 98 mole percent of acrylonitrile have a combination of properties that render them especially desirable.

The polymers of this invention may be employed for the production of filaments, films and the like by dry-spinning or wet-spinning processes. They may also be employed for the production of adhesives and coating compositions. The polymers may be mixed with plasticizers, softening agents, pigments, ultraviolet light absorbents, and other materials having a decorative effect or capable of changing the appearance or properties of the final products.

The polymerizations may be carried out in bulk, in solution, or in suspension or dispersion. There may be present during the polymerization suitable polymerization catalysts, initiators, accelerators, chain transfer agents, redox systems, emulsifiers and the like, all as well known in the art of polymerizing acrylonitrile and other unsaturated compounds.

The following examples are given to illustrate this invention further.

*Example I*

There is added to a vessel 9.5 parts by weight of acrylonitrile and 0.36 parts by weight of N-benzylacrylamide, the latter in the form of 10.36 parts by weight of a solution of 36 parts by weight of N-benzylacrylamide in 300 parts by weight of N,N-dimethylformamide, and 700 parts by weight of water, which solution has been purified of inhibitory materials by passage through two columns containing, respectively, an anion exchange resin and a cation exchange resin. Then 110 parts by weight of a solvent mixture, consisting of 33 parts by weight of N,N-dimethylformamide and 77 parts by weight of water, which has also been purified by passage over ion exchange resins, is added to the vessel. Air is displaced from the vessel by a stream of nitrogen gas and there is added 5 parts by weight of a 1% aqueous solution of potassium persulfate and 5 parts by weight of a 1% aqueous solution of sodium metabisulfite. The vessel is then sparged with nitrogen and the polymerization is carried out with agitation for a period of 16.75 hours at a temperature of 45° C. The polymer precipitates from the reaction medium and is recovered by filtration, washed with water and dried. There are obtained 2.52 parts by weight of polymer having an acrylonitrile content of 96.6 mole percent as determined by nitrogen analysis.

The polymer exhibits a tack point of 177° C. on a melting point block as compared with 190° C. for polyacrylonitrile. The polymer is soluble in dimethylformamide, ethylene carbonate, a mixture of 20 parts by volume of ethylene carbonate and 80 parts by volume of acetonitrile, and in a mixture of 90 parts by volume of nitromethane and 10 parts by volume of formic acid. The polymer may be employed for the production of filaments and films which exhibit a good affinity for common dyestuffs.

*Example II*

A polymer is prepared in the manner set forth in Example I, but employing 8.0 parts by weight of acrylonitrile and 1.460 parts by weight of N-benzylacrylamide together with a total of 120 parts by weight of 30% by weight aqueous N,N-dimethylformamide. There are obtained 1.89 parts by weight of a polymer having an acrylonitrile content of 91 mole percent as determined by nitrogen analysis.

The polymer exhibits a tack point of 158° C. It is soluble in all the solvents in which the polymer of Example I is soluble and is also soluble in nitromethane, a mixture of 20 parts by volume of dimethylformamide and 80 parts by volume of nitromethane, and a mixture of 80 parts by volume of cyclohexanone and 20 parts by volume of nitromethane.

*Example III*

A polymer is prepared in the manner set forth in Examples I and II, but employing 7.0 parts by weight of acrylonitrile and 2.19 parts by weight of N-benzylacrylamide together with sufficient 30% by weight aqueous N,N-dimethylformamide to bring the volume to the same as in Examples I and II. There are obtained 2.71 parts by weight of a polymer having an acrylonitrile content of 85 mole percent as determined by nitrogen analysis.

The polymer exhibits a tack point of 132° C. It is soluble in all the solvents in which the polymer of Example II is soluble and is also soluble in a mixture of 40 parts by volume of acetonitrile and 60 parts by volume of nitromethane, and in a mixture of 80 parts by volume of cyclohexanone and 20 parts by volume of dimethylformamide. The polymer is also soluble at an elevated temperature in a mixture of 80 parts by volume of cyclohexanone and 20 parts by volume of nitromethane and in a mixture of 20 parts by volume of cyclohexanone and 80 parts by volume of nitromethane.

*Example IV*

A polymer is prepared in the manner set forth in Examples I and II, but employing 6.0 parts by weight of acrylonitrile and 2.92 parts by weight of N-benzylacrylamide together with sufficient 30% by weight aqueous N,N-dimethylformamide to bring the volume to the same as in Examples I and II. There are obtained 4.47 parts by weight of a polymer having an acrylonitrile content of 81 mole percent as determined by nitrogen analysis.

The polymer exhibits a tack temperature of 133° C. It is soluble cold in all the solvents in which the polymer of Example III is soluble and is also soluble in a mixture of 20 parts by volume of acetonitrile and 80 parts by volue of nitromethane, and in dimethylsulfolane.

*Example V*

N-benzylacrylamide is polymerized in the manner set forth in Example I, employing 5.4 parts by weight of monomer in 150 parts by weight of 30% aqueous N,N-dimethylformamide. There are obtained 2.90 parts by weight of polymer which exhibits a tack temperature of 126° C.

It is to be understood that the foregoing detailed description is given merely by way of illustration and that many variations may be made therein without departing from the spirit by Letters Patent is:

1. A copolymer of N-benzylacrylamide and acrylonitrile containing at least about 50 mole percent of acrylonitrile and substantially free from other polymerizable substances.

2. A copolymer of N-benzylacrylamide and acrylonitrile containing between about 75 and 98 mole percent of acrylonitrile and substantially free from other polymerizable substances.

3. A process for the production of polymeric compounds which comprises copolymerizing N-benzylacrylamide with at least about 50 mole percent of acrylonitrile in the absence of other polymerizable substances.

4. A process for the production of polymeric compounds which comprises copolymerizing N-benzylacrylamide with between about 75 and 98 mole percent of acrylonitrile in the absence of other polymerizable substances.

5. A solution of the copolymer of claim 2 in a mixture of cyclohexanone and nitromethane.

6. A solution of the copolymer of claim 2 in nitromethane.

7. A solution of the copolymer of claim 2 in a mixture of acetonitrile and nitromethane.

8. A solution of the copolymer of claim 2 in dimethylsulfolane.

References Cited in the file of this patent

UNITED STATES PATENTS

| | | |
|---|---|---|
| 2,401,885 | Semon | June 11, 1946 |
| 2,436,926 | Jacobson | Mar. 2, 1948 |
| 2,487,859 | Dickey | Nov. 15, 1949 |
| 2,598,663 | Kropa | June 3, 1952 |
| 2,631,995 | Bruson | Mar. 17, 1953 |

FOREIGN PATENTS

| | | |
|---|---|---|
| 475,671 | Great Britain | Nov. 24, 1937 |
| 882,123 | France | Feb. 15, 1943 |

OTHER REFERENCES

U. S. Publication Board, Report 70429 Frames 8645–56, Apr. 21, 1941.

U. S. Publication Board, Report 70335 Frames 3391–3402, Dec. 28, 1940.